J. W. & G. B. BURNS.
WOOD PLANER CUTTER HEAD.
APPLICATION FILED MAR. 10, 1909.
932,373.
Patented Aug. 24, 1909.
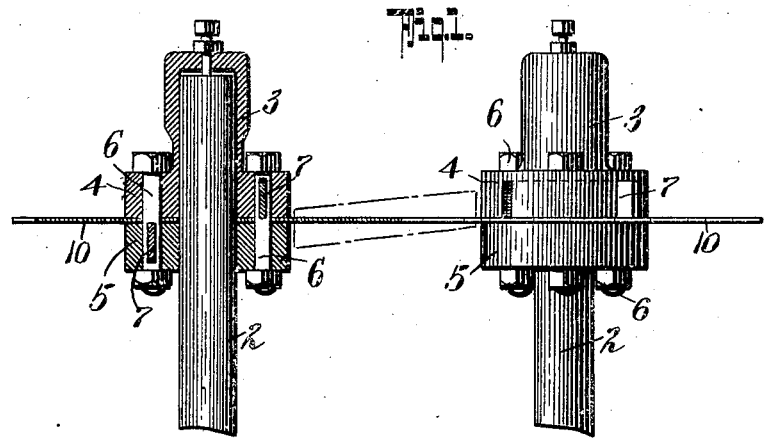
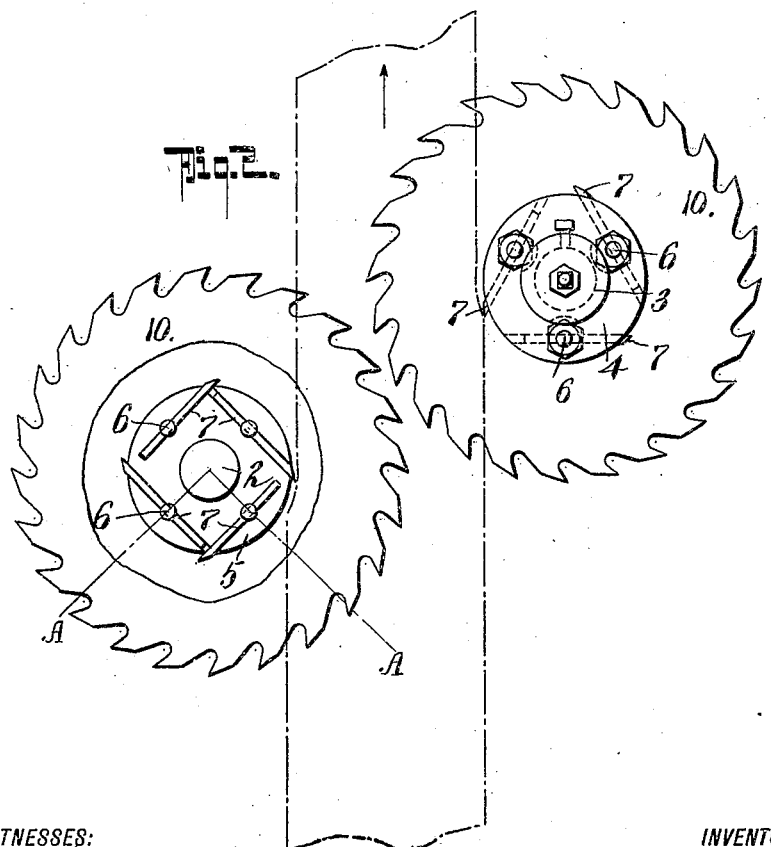
WITNESSES:
Hayward Woodard
Charles H. Wagner
INVENTORS
John W. Burns
George B. Burns
BY
Fred G. Dieterich
ATTORNEY

UNITED STATES PATENT OFFICE.

JOHN W. BURNS AND GEORGE B. BURNS, OF NEW WESTMINSTER, BRITISH COLUMBIA, CANADA.

WOOD-PLANER CUTTER-HEAD.

932,373.  Specification of Letters Patent.  Patented Aug. 24, 1909.

Application filed March 10, 1909. Serial No. 482,419.

*To all whom it may concern:*

Be it known that we, JOHN W. BURNS and GEORGE B. BURNS, citizens of the Dominion of Canada and the United States of America, respectively, residing at New Westminster, in the Province of British Columbia, Canada, have invented a new and useful Wood-Planer Cutter-Head, of which the following is a specification.

This invention relates to a cutter head for a wood planing machine, and is designed to enable a board to be divided in its thickness in the same machine and in the same operation in which its faces and edges are dressed. In the manufacture of bevel siding, for which there is an increasing demand and for which this cutter head has been particularly designed, the customary practice is to first dress the boards in an ordinary planer to the required width and thickness and to thereafter pass them through a separate and specially constructed machine that will split or divide the thickness of the board at the required bevel. It is to save the requirement of this separate machine and its operator and the unnecessary handling of the lumber by performing the work of dressing the boards and of splitting them in one operation that the cutter head which is the subject of this application has been devised. In it we furnish an upper and lower separate cutter carrying portions for each head between which is secured a circular splitting saw and these heads are applied to the vertical spindles which in an ordinary planer carry the edge dressing cutter heads so that as a board is passed through the planer its top and bottom are dressed by one pair of cutters and as it passes through between the edge dressing cutters the edges are not only dressed but the board is horizontally split. Although originally intended for cutting bevel siding the cutter head is susceptible of application to a variety of purposes.

The invention is particularly described in the following specification reference being made to the drawings by which it is accompanied, in which;

Figure 1. is an end elevation showing the application of two cutter heads to split and dress the edges of a board one of the cutter heads being shown in section in a development of the plane A A in Fig. 2, and Fig. 2. a plan of the same, the upper part of the cutter head of one and the central portion of the saw being removed to show the arrangement of the cutters.

In these drawings 2 represents the vertical spindles which in an ordinary wood planing machine carry the edge dressing cutter heads. On each of these spindles 2 is secured by a set screw or other approved means, a cutter head 3, the cutter carrying portion 4 of which has secured to it by bolts 6 a corresponding cutter carrying portion 5, and between these two upper and lower cutter carrying portions of the head is secured by the same bolts 6, which hold the two cutter carrying portions together, a circular saw 10.

Each cutter carrying portion 4 and 5 is recessed to carry the edge cutters 7 and these cutters 7 are secured in their respective upper and lower parts of the head by the bolts 6 which secure the two parts together which bolts are slotted to receive the cutters. For purposes of illustration one head in the drawing is shown as carrying four cutters two oppositely disposed in the upper and two in the lower part; while the other head is shown as provided with three two of which must necessarily be in one portion and one in the other.

The bolts 6 will preferably be provided with a nut at each end so that the cutters 7 may be tightly drawn into their respective recesses in the upper and lower portions 4 and 5 as shown in the section on the left of Fig. 1, while the other nut will tighten the two parts 4 and 5 together on the saw blade 10.

The cutter spindles may be placed one in advance of the other so that the saw cuts will overlap and avoid the formation of a fin or ridge where they meet, but it will be obvious that it is not a necessary part of the invention that the operation of splitting the thickness of the board be performed with two saws as in narrow boards it may be done by one saw.

The cutter head may be applied to a machine for the cutting of bevel siding where the spindles are susceptible of being angled and vertically adjusted in relation to the table or to any spindle as the head may be applied to dress and split a board parallel to its top and bottom faces without departing in any way from the spirit of the invention, the essential feature of which is the combination of a circular saw introduced between two cutter carrying portions that will dress the edges while the saw will split the thickness of the board.

A simple and effective cutter head is thus provided that will in one operation enable the edges of the board to be dressed and the board to be split with a manifest economy in the cost of operation and handling.

Having now particularly described our invention and the manner of its use we hereby declare that what we claim as new and desire to be protected in by Letters Patent is;

1. A planer cutter-head comprising in combination two similar cutter holders concentrically secured to the same spindle each holder having recesses for the reception of edge cutters, bolts slotted for the reception of the cutters by which the cutters may be secured in their recesses by means of nuts on the adjacent ends of the bolts, said bolts also passing through the other cutter holder and provided with nuts by which that cutter holder may be tightened on a circular saw interplaced between the two cutter holders.

2. A planer cutter-head comprising in combination, an upper cutter holder having means by which it may be secured to the spindle of the machine, and having recesses for the reception of edge cutters, a lower cutter holder having similar cutter holding recesses, a circular saw between these two cutter holders, and bolts passing through the cutter holding recesses in each cutter holder, and nuts carried by said bolts for securing the cutters in their recesses and for securing the two cutter holding portions together and tightening them on the interplaced saw.

3. A planer cutter head comprising the upper cutter holder and a lower cutter holder, means for securing the cutters of the upper cutter holder to an interplaced saw and simultaneously securing the saw to the lower cutter holder, and means for securing the cutters of the lower cutter holder to the saw and to the upper cutter holder.

4. A planer cutter head comprising an upper and a lower cutter holder and an interposed disk, bolts passing through said cutter holders and said disk and slotted to permit passage of said cutters, and means carried by certain of said bolts for drawing the cutters of the upper cutter head against said disk and drawing said disk against said lower cutter head, and other means carried by others of said bolts for drawing the cutters of the lower cutter holder against said disk and against the upper cutter holder, substantially as shown and described.

In testimony whereof we have severally signed our names to this specification in the presence of two subscribing witnesses.

JOHN W. BURNS.
GEO. B. BURNS.

Signed in the presence of—
EDGAR H. BUCKLIN,
LYDIA L. TUCKER.